(12) United States Patent
Indurkar (10) Patent No.: US 9,420,496 B1
(45) Date of Patent: Aug. 16, 2016

(54) ACTIVATION SEQUENCE USING PERMISSION BASED CONNECTION TO NETWORK

(71) Applicant: Sprint Communications Company L.P., Overland Park, KS (US)

(72) Inventor: Dhananjay Indurkar, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 149 days.

(21) Appl. No.: 14/163,041

(22) Filed: Jan. 24, 2014

(51) Int. Cl.
*H04M 3/00* (2006.01)
*H04W 36/00* (2009.01)
*H04W 4/00* (2009.01)
*H04W 88/02* (2009.01)
*H04W 76/02* (2009.01)

(52) U.S. Cl.
CPC .......... *H04W 36/0022* (2013.01); *H04W 4/001* (2013.01); *H04W 76/02* (2013.01); *H04W 88/02* (2013.01)

(58) Field of Classification Search
CPC ...... H04W 4/001; H04W 76/02; H04W 88/02
USPC ........................................ 455/414.1, 418–420
See application file for complete search history.

(56) References Cited

U.S. PATENT DOCUMENTS

| | | | |
|---|---|---|---|
| 6,131,024 A | 10/2000 | Boltz | |
| 6,445,914 B1 | 9/2002 | Findikli et al. | |
| 6,753,887 B2 | 6/2004 | Carolan et al. | |
| 7,165,191 B1 | 1/2007 | Vakrat | |
| 7,260,382 B1 | 8/2007 | Lamb et al. | |
| 7,266,371 B1 | 9/2007 | Amin et al. | |
| 7,493,111 B2 | 2/2009 | Knowles | |
| 7,817,988 B2 | 10/2010 | Kruis et al. | |
| 7,904,895 B1 | 3/2011 | Cassapakis et al. | |
| 7,991,988 B2 | 8/2011 | Chen | |
| 8,107,926 B2 | 1/2012 | Goto | |
| 8,185,097 B2 | 5/2012 | Vanderlinden et al. | |

(Continued)

FOREIGN PATENT DOCUMENTS

| | | |
|---|---|---|
| GB | 2292047 A | 2/1996 |
| KR | 2006039974 A | 5/2006 |

(Continued)

OTHER PUBLICATIONS

Advisory Action dated Dec. 17, 2014, U.S. Appl. No. 13/622,234, filed Sep. 18, 2012.

(Continued)

*Primary Examiner* — Charles Appiah
*Assistant Examiner* — Jaime Holliday (57) ABSTRACT

Embodiments of the disclosure are directed to methods and systems for establishing a network connection with a mobile communication device. A mobile device may comprise an activation application operable to detect network connection options. Additionally, the activation application may determine the quality of the connection options and attempt to establish a connection with the network via one or more of the connection options. The activation application may use the network connection to request and receive an activation payload, which may be used to complete the activation process. In some cases, the activation application may facilitate the input of credentials for one or more connection option.

16 Claims, 7 Drawing Sheets

(56) References Cited

U.S. PATENT DOCUMENTS

| | | |
|---|---|---|
| 8,185,101 B1 | 5/2012 | Wiseman et al. |
| 8,249,654 B1 | 8/2012 | Zhu |
| 8,260,281 B2 | 9/2012 | Urbanek |
| 8,401,538 B2 | 3/2013 | Urbanek |
| 8,401,595 B2 | 3/2013 | Zhu et al. |
| 8,433,953 B1 | 4/2013 | Gaudette et al. |
| 8,442,521 B2 | 5/2013 | Fleischman et al. |
| 8,571,536 B2 | 10/2013 | Urbanek |
| 8,612,967 B1 | 12/2013 | Delker |
| 8,626,165 B1 | 1/2014 | Narasimhan et al. |
| 8,666,383 B1 | 3/2014 | Mauer et al. |
| 8,819,188 B2 | 8/2014 | Blatherwick et al. |
| 8,825,039 B2 | 9/2014 | Mizuguchi |
| 8,855,012 B1 | 10/2014 | Suri |
| 8,909,291 B1 | 12/2014 | Spanel et al. |
| 8,938,436 B2 | 1/2015 | Kozempel |
| 9,020,479 B1 | 4/2015 | Somayajula et al. |
| 9,026,105 B2 | 5/2015 | Shipley et al. |
| 9,042,877 B1 | 5/2015 | Ghoshal et al. |
| 9,098,368 B1 | 8/2015 | Delker |
| 9,100,769 B2 | 8/2015 | Annan et al. |
| 9,100,819 B2 | 8/2015 | Annan et al. |
| 9,125,037 B2 | 9/2015 | Masterson et al. |
| 9,143,924 B1 | 9/2015 | Abou-El-Ella et al. |
| 9,161,209 B1 | 10/2015 | Ghoshal et al. |
| 9,161,325 B1 | 10/2015 | Urbanek |
| 9,170,870 B1 | 10/2015 | Masterson et al. |
| 9,198,027 B2 | 11/2015 | Urbanek |
| 9,204,239 B1 | 12/2015 | Sumner |
| 9,204,286 B1 | 12/2015 | Annan et al. |
| 9,208,513 B1 | 12/2015 | Mauer et al. |
| 9,226,133 B1 | 12/2015 | Spanel et al. |
| 9,280,483 B1 | 3/2016 | Ghoshal et al. |
| 9,301,081 B1 | 3/2016 | Callan et al. |
| 9,307,400 B1 | 4/2016 | Blinn et al. |
| 2002/0091931 A1 | 7/2002 | Quick, Jr. et al. |
| 2003/0023514 A1 | 1/2003 | Adler et al. |
| 2003/0031235 A1 | 2/2003 | Kim et al. |
| 2003/0217145 A1 | 11/2003 | Leung et al. |
| 2004/0033798 A1 | 2/2004 | Robin et al. |
| 2004/0092248 A1 | 5/2004 | Kelkar et al. |
| 2004/0093109 A1 | 5/2004 | O'Connor et al. |
| 2004/0116163 A1 | 6/2004 | Kim et al. |
| 2004/0137890 A1 | 7/2004 | Kalke |
| 2004/0137891 A1 | 7/2004 | Clark et al. |
| 2004/0261041 A1 | 12/2004 | Parakkuth et al. |
| 2005/0020308 A1 | 1/2005 | Lai |
| 2005/0079855 A1 | 4/2005 | Jethi et al. |
| 2005/0079863 A1 | 4/2005 | Macaluso |
| 2005/0085222 A1 | 4/2005 | Przybilski et al. |
| 2005/0119001 A1 | 6/2005 | Watanabe |
| 2005/0164737 A1 | 7/2005 | Brown |
| 2005/0188262 A1 | 8/2005 | Rosenman et al. |
| 2005/0197098 A1 | 9/2005 | Trossen |
| 2006/0025151 A1 | 2/2006 | Karaoguz et al. |
| 2006/0121894 A1* | 6/2006 | Ganesan ............ H04W 36/14 455/432.1 |
| 2006/0135144 A1 | 6/2006 | Jothipragasam |
| 2006/0154651 A1 | 7/2006 | Knowles |
| 2006/0203722 A1 | 9/2006 | Oommen |
| 2006/0208071 A1 | 9/2006 | Chang et al. |
| 2006/0235944 A1 | 10/2006 | Haslam |
| 2006/0236325 A1 | 10/2006 | Rao et al. |
| 2006/0246949 A1 | 11/2006 | Gupta et al. |
| 2007/0004404 A1 | 1/2007 | Buckley et al. |
| 2007/0015538 A1 | 1/2007 | Wang |
| 2007/0082655 A1 | 4/2007 | Link et al. |
| 2007/0099599 A1 | 5/2007 | Smith et al. |
| 2007/0129057 A1 | 6/2007 | Xu et al. |
| 2007/0130156 A1 | 6/2007 | Tenhunen et al. |
| 2007/0165654 A1 | 7/2007 | Chai et al. |
| 2007/0169084 A1 | 7/2007 | Frank et al. |
| 2007/0190939 A1 | 8/2007 | Abel |
| 2007/0197234 A1 | 8/2007 | Gill et al. |
| 2007/0250645 A1 | 10/2007 | Meadows et al. |
| 2007/0254635 A1 | 11/2007 | Montelius |
| 2008/0039114 A1 | 2/2008 | Phatak et al. |
| 2008/0046583 A1 | 2/2008 | Rao |
| 2008/0046880 A1 | 2/2008 | Jun et al. |
| 2008/0046997 A1 | 2/2008 | Wang |
| 2008/0057957 A1 | 3/2008 | Altbaum et al. |
| 2008/0062900 A1 | 3/2008 | Rao |
| 2008/0065753 A1 | 3/2008 | Rao |
| 2008/0109662 A1 | 5/2008 | Natarajan et al. |
| 2008/0146280 A1 | 6/2008 | Sasse et al. |
| 2008/0155275 A1 | 6/2008 | Natarajan et al. |
| 2008/0160970 A1 | 7/2008 | Srinivas Reddy et al. |
| 2008/0167027 A1 | 7/2008 | Gautier et al. |
| 2008/0171532 A1 | 7/2008 | Shieh et al. |
| 2008/0225806 A1 | 9/2008 | Arian et al. |
| 2008/0281511 A1 | 11/2008 | Miyata |
| 2008/0300967 A1 | 12/2008 | Buckley et al. |
| 2008/0318547 A1 | 12/2008 | Ballou, Jr. et al. |
| 2009/0036165 A1 | 2/2009 | Brede |
| 2009/0061840 A1 | 3/2009 | Fleischman et al. |
| 2009/0075592 A1 | 3/2009 | Nystrom et al. |
| 2009/0093242 A1 | 4/2009 | Bhalekar et al. |
| 2009/0094350 A1 | 4/2009 | Rive et al. |
| 2009/0106200 A1 | 4/2009 | Salinas et al. |
| 2009/0124250 A1 | 5/2009 | Topaltzas et al. |
| 2009/0156190 A1 | 6/2009 | Fisher |
| 2009/0156209 A1 | 6/2009 | Franklin et al. |
| 2009/0239518 A1 | 9/2009 | Feuillette |
| 2009/0247124 A1 | 10/2009 | de Atley et al. |
| 2009/0259974 A1 | 10/2009 | Lin |
| 2009/0260004 A1 | 10/2009 | Datta et al. |
| 2009/0307763 A1 | 12/2009 | Rawlins et al. |
| 2010/0048193 A1 | 2/2010 | Ortion et al. |
| 2010/0060456 A1 | 3/2010 | Forster |
| 2010/0075669 A1 | 3/2010 | Sparks et al. |
| 2010/0080143 A1 | 4/2010 | Topaltzas et al. |
| 2010/0133335 A1 | 6/2010 | Maguid et al. |
| 2010/0136960 A1 | 6/2010 | Knezevic |
| 2010/0159876 A1 | 6/2010 | Brown et al. |
| 2010/0161724 A1 | 6/2010 | Sathyan et al. |
| 2010/0167696 A1 | 7/2010 | Smith et al. |
| 2010/0192120 A1 | 7/2010 | Raleigh |
| 2010/0198939 A1 | 8/2010 | Raleigh |
| 2010/0203864 A1 | 8/2010 | Howard |
| 2010/0207742 A1 | 8/2010 | Buhot et al. |
| 2010/0222031 A1* | 9/2010 | Carolan et al. ............. 455/414.1 |
| 2010/0222047 A1 | 9/2010 | Vanderlinden et al. |
| 2010/0262638 A1 | 10/2010 | Fitzgerald |
| 2010/0291898 A1* | 11/2010 | Sanding et al. ................ 455/418 |
| 2010/0311404 A1 | 12/2010 | Shi et al. |
| 2010/0311468 A1 | 12/2010 | Shi et al. |
| 2010/0312794 A1 | 12/2010 | Liu |
| 2010/0325622 A1 | 12/2010 | Morton |
| 2010/0332639 A1 | 12/2010 | Diaz et al. |
| 2011/0003590 A1 | 1/2011 | Yoon et al. |
| 2011/0014913 A1 | 1/2011 | Yoon et al. |
| 2011/0026501 A1 | 2/2011 | Sharaga et al. |
| 2011/0028138 A1 | 2/2011 | Davies-Moore et al. |
| 2011/0030062 A1 | 2/2011 | Hsu et al. |
| 2011/0035421 A1 | 2/2011 | Laird-McConnell et al. |
| 2011/0069702 A1 | 3/2011 | Oktay et al. |
| 2011/0081885 A1 | 4/2011 | Sennett et al. |
| 2011/0119716 A1 | 5/2011 | Coleman, Sr. |
| 2011/0138074 A1 | 6/2011 | Onda et al. |
| 2011/0161659 A1 | 6/2011 | Himawan et al. |
| 2011/0165836 A1 | 7/2011 | Dixon et al. |
| 2011/0173685 A1 | 7/2011 | Chai et al. |
| 2011/0202680 A1 | 8/2011 | Bells et al. |
| 2011/0202976 A1* | 8/2011 | Chow et al. ...................... 726/4 |
| 2011/0208338 A1 | 8/2011 | Eteminan et al. |
| 2011/0208865 A1 | 8/2011 | Knowles et al. |
| 2011/0222404 A1 | 9/2011 | Watson et al. |
| 2011/0230136 A1 | 9/2011 | Washiro |
| 2011/0258249 A1 | 10/2011 | Biggs et al. |
| 2011/0263294 A1 | 10/2011 | Kim et al. |
| 2011/0294484 A1* | 12/2011 | Martin et al. .................. 455/418 |
| 2011/0296399 A1 | 12/2011 | Tugnawat et al. |
| 2011/0306318 A1 | 12/2011 | Rodgers et al. |
| 2011/0314129 A1 | 12/2011 | Rezaiifar et al. |

(56) References Cited

U.S. PATENT DOCUMENTS

| | | |
|---|---|---|
| 2012/0027059 A1 | 2/2012 | Zhao et al. |
| 2012/0035989 A1 | 2/2012 | Abel et al. |
| 2012/0036282 A1 | 2/2012 | Chen et al. |
| 2012/0046022 A1 | 2/2012 | Kalke et al. |
| 2012/0047227 A1 | 2/2012 | Haggerty et al. |
| 2012/0094684 A1 | 4/2012 | Reddy |
| 2012/0106509 A1 | 5/2012 | Klingenbrunn et al. |
| 2012/0129513 A1 | 5/2012 | Van der Laak |
| 2012/0129572 A1 | 5/2012 | Johnstone et al. |
| 2012/0135733 A1 | 5/2012 | Cormier et al. |
| 2012/0158580 A1 | 6/2012 | Eram et al. |
| 2012/0203824 A1 | 8/2012 | Oommen |
| 2012/0208511 A1 | 8/2012 | Vanderlinden et al. |
| 2012/0230587 A1 | 9/2012 | Arseneau |
| 2012/0260095 A1 | 10/2012 | Von Hauck et al. |
| 2012/0276872 A1 | 11/2012 | Knauth et al. |
| 2012/0282891 A1 | 11/2012 | Mohammed et al. |
| 2012/0282924 A1 | 11/2012 | Tagg et al. |
| 2013/0010641 A1* | 1/2013 | Dinan .................. 370/254 |
| 2013/0013671 A1 | 1/2013 | Relan et al. |
| 2013/0023235 A1 | 1/2013 | Fan et al. |
| 2013/0031191 A1 | 1/2013 | Bott |
| 2013/0031234 A1 | 1/2013 | Alfano et al. |
| 2013/0041988 A1 | 2/2013 | Rodermund et al. |
| 2013/0046951 A1 | 2/2013 | Jones |
| 2013/0065557 A1 | 3/2013 | Zhang et al. |
| 2013/0065578 A1 | 3/2013 | Raleigh et al. |
| 2013/0072168 A1 | 3/2013 | Colucciello et al. |
| 2013/0080911 A1 | 3/2013 | Klemm |
| 2013/0085914 A1 | 4/2013 | McPherson et al. |
| 2013/0111461 A1 | 5/2013 | Zubas et al. |
| 2013/0184029 A1 | 7/2013 | Lim et al. |
| 2013/0196647 A1* | 8/2013 | Raleigh et al. .......... 455/418 |
| 2013/0198567 A1 | 8/2013 | Ahmed et al. |
| 2013/0222395 A1 | 8/2013 | Blas, Jr. |
| 2013/0303142 A1 | 11/2013 | Burcham et al. |
| 2013/0310003 A1 | 11/2013 | Sadhvani et al. |
| 2013/0311836 A1 | 11/2013 | Hurst et al. |
| 2013/0318518 A1 | 11/2013 | Paalanen et al. |
| 2014/0045483 A1 | 2/2014 | Whidden |
| 2014/0068779 A1 | 3/2014 | Tan et al. |
| 2014/0075567 A1* | 3/2014 | Raleigh et al. ............ 726/26 |
| 2014/0080467 A1 | 3/2014 | Urbanek |
| 2014/0099916 A1 | 4/2014 | Mallikarjunan et al. |
| 2014/0113610 A1 | 4/2014 | Ramprasad et al. |
| 2014/0122563 A1 | 5/2014 | Singh et al. |
| 2014/0134981 A1 | 5/2014 | Park et al. |
| 2014/0140507 A1 | 5/2014 | Park et al. |
| 2014/0206313 A1 | 7/2014 | Spanel et al. |
| 2014/0228012 A1 | 8/2014 | Annan et al. |
| 2014/0228042 A1 | 8/2014 | Annan et al. |
| 2014/0274032 A1 | 9/2014 | Shipley et al. |
| 2014/0342715 A1 | 11/2014 | Gu et al. |
| 2014/0373184 A1 | 12/2014 | Mahaffey et al. |
| 2015/0011311 A1 | 1/2015 | Relan et al. |
| 2015/0017962 A1 | 1/2015 | Howard et al. |
| 2015/0065105 A1 | 3/2015 | Masterson et al. |
| 2015/0111564 A1 | 4/2015 | Urbanek |
| 2015/0111565 A1 | 4/2015 | Urbanek |
| 2015/0133094 A1 | 5/2015 | Lindeman et al. |
| 2015/0193217 A1 | 7/2015 | Xiang et al. |
| 2015/0304506 A1 | 10/2015 | Zhu et al. |
| 2015/0331590 A1 | 11/2015 | Yasui |
| 2015/0370428 A1 | 12/2015 | Chan et al. |
| 2016/0094931 A1 | 3/2016 | Urbanek |

FOREIGN PATENT DOCUMENTS

| | | |
|---|---|---|
| WO | WO2012078753 A1 | 6/2012 |
| WO | WO2013169983 A1 | 11/2013 |
| WO | WO2014020237 A1 | 2/2014 |
| WO | WO2014046814 A1 | 3/2014 |
| WO | WO2014113128 A1 | 7/2014 |
| WO | WO2014123758 A1 | 8/2014 |
| WO | WO2014123759 A1 | 8/2014 |
| WO | WO2014158430 A1 | 9/2014 |
| WO | WO2015030945 A1 | 3/2015 |
| WO | WO2015060965 A2 | 4/2015 |

OTHER PUBLICATIONS

Notice of Allowance dated Nov. 22, 2014, U.S. Appl. No. 13/744,861, filed Jan. 18, 2013.

First Action Interview Pre-Interview Communication dated Oct. 22, 2014, U.S. Appl. No. 13/763,428, filed Feb. 8, 2013.

Notice of Allowance dated Dec. 29, 2014, U.S. Appl. No. 13/831,504, filed Mar. 14, 2013.

First Action Interview Pre-Interview Communication dated Nov. 20, 2014, filed on May 21, 2013.

Foreign Communication from a Related Counterpart Application, "Preliminary Report on Patentability," dated Nov. 20, 2014, PCT/US13/40278 filed on May 9, 2013.

Foreign Communication from a Related Counterpart—International Search Report and Written Opinion, dated Dec. 17, 2014, PCT/US14/46773, filed on Jul. 16, 2014 [36501].

Foreign Communication from a Related Counterpart—International Search Report and Written Opinion, dated Dec. 30, 2014, PCT/US14/56778, filed Sep. 22, 2014, [35501].

Spanel, Robert L., et al., Patent Application entitled "Dynamic Remotely Managed SIM Profile" U.S. Appl. No. 14/522,586, filed Oct. 24, 2014.

Urbanek, Robert E, "Delivery of Branding Content and Customizations to a Mobile Communication Device", filed Sep. 22, 2014, International Serial No. PCT/US14/56778.

Koller, Gary D., et al., "Out of the Box Experience (OOBE) Country Choice Using Wi-Fi Layer Transmission," filed Oct. 31, 2014, U.S. Appl. No. 14/530,666.

Blinn, Benjamin P., et al. "System and Method of Efficient Mobile Device Network Brand Customization," filed Sep. 2, 2014, U.S. Appl. No. 14/475,399.

Notice of Allowance dated Apr. 26, 2012, U.S. Appl. No. 12/962,620, filed Dec. 7, 2010.

Notice of Allowance dated Nov. 2, 2012, U.S. Appl. No. 13/556,202, filed Jul. 24, 2012.

Notice of Allowance dated Jun. 11, 2013, U.S. Appl. No. 13/752,386, filed Jan. 28, 2013.

First Action Interview Pre-Interview Communication dated Feb. 25, 2013, U.S. Appl. No. 13/149,505, filed May 31, 2013.

First Action Interview Office Action dated May 8, 2013, U.S. Appl. No. 13/149,505, filed May 31, 2013.

Notice of Allowance dated Aug. 9, 2013, U.S. Appl. No. 13/149,505, filed May 31, 2013.

First Action Interview Pre-Interview Communication dated Aug. 13, 2013, U.S. Appl. No. 13/335,941, filed Dec. 23, 2011.

Notice of Allowance dated Oct. 9, 2013, U.S. Appl. No. 13/335,941, filed Dec. 23, 2011.

First Action Interview Pre-Interview Communication dated Apr. 23, 2014, U.S. Appl. No. 13/622,234, filed Sep. 18, 2012.

Final Office Action dated Sep. 19, 2014, U.S. Appl. No. 13/622,234, filed Sep. 18, 2012.

FAIPP Pre-Interview Communication dated Mar. 19, 2014, U.S. Appl. No. 13/744,847, filed Jan. 18, 2013.

Notice of Allowance dated Aug. 4, 2014, U.S. Appl. No. 13/744,847, filed Jan. 18, 2013.

FAIPP Pre-Interview Communication dated Jul. 16, 2014, U.S. Appl. No. 13/744,861, filed Jan. 18, 2013.

First Action Interview Pre-Interview Communication dated Apr. 3, 2014, U.S. Appl. No. 13/763,434, filed Feb. 8, 2013.

Final Office Action dated Aug. 19, 2014, U.S. Appl. No. 13/763,434, filed Feb. 8, 2013.

Office Action dated Aug. 7, 2014, U.S. Appl. No. 13/831,504, filed Mar. 14, 2013.

Foreign Communication from a Related Counterpart—International Search Report and Written Opinion, dated Feb. 29, 2012, PCT/US2011/063736, filed on Dec. 7, 2011 [06801].

(56) References Cited

OTHER PUBLICATIONS

Foreign Communication from a Related Counterpart Application, "Preliminary Report on Patentability", dated Jun. 20, 2013, PCT/US2011/063736 filed on Dec. 7, 2011 [06801].
Foreign Communication from a Related Counterpart—International Search Report and Written Opinion, dated Jul. 24, 2013, PCT/US13/40278, filed on May 9, 2013 [15901].
Foreign Communication from a Related Counterpart—International Search Report and Written Opinion, dated Nov. 14, 2013, PCT/US13/55023, filed on Aug. 15, 2013 [16801].
Foreign Communication from a Related Counterpart Application, International Search Report and Written Opinion dated Jan. 24, 2014, International Application No. PCT/US13/68981 filed on Nov. 7, 2013 [22601].
Foreign Communication from a Related Counterpart—International Search Report and Written Opinion, dated May 19, 2014, PCT/US14/13936, filed on Jan. 30, 2014 [28701].
Foreign Communication from a Related Counterpart—International Search Report and Written Opinion, dated May 14, 2014, PCT/US14/13939, filed on Jan. 30, 2014 [28801].
Delker, Jason R., "Loading Branded Media Outside System Partition", filed Oct. 30, 2013 U.S. Appl. No. 14/066,947.
Mauer, Brian D., et al., "Automatic Branding of Generic Applications", filed Jan. 10, 2013, U.S. Appl. No. 14/152,627.
Spanel, Robert L., et al., Patent Application entitled "Dynamic Remotely Managed SIM Profile" U.S. Appl. No. 13/744,847, filed Jan. 18, 2013.
Annan, Brandon C., et al.,"System and Method of Branding and Labeling a Mobile Device", filed Mar. 15, 2013, U.S. Appl. No. 13/844,104.
Annan, Brandon C., et al.,"Electronic Fixed Brand Labeling", filed Feb. 8, 2013, U.S. Appl. No. 13/763,443.
Ghoshal, Jagannath, et al.,"Rebranding a Portable Electronic Device While Maintaining User Data", filed May 22, 2013, U.S. Appl. No. 13/899,567.
Ghoshal, Jagannath, et al.,"System and Method for Retrofitting a Branding Framework into a Mobile Communication Device", filed May 21, 2013, U.S. Appl. No. 13/899,566.
Urbanek, Robert E., "Delivery of Branding Content and Customizations to a Mobile Communication Device", filed Oct. 23, 2013, U.S. Appl. No. 14/060,712.
Urbanek, Robert E., "Implementation of Remotely Hosted Branding Content and Customizations", filed Oct. 23, 2013, U.S. Appl. No. 14/085,474.
Urbanek, Robert E., "Subscriber Identity Module Virtualization", filed Nov. 20, 2013, U.S. Appl. No. 14/060,719.
Indurkar, Dhananjay, "System and Method of Branding a Device Independent of Device Activation", filed Jan. 24, 2014, U.S. Appl. No. 14/163,035.
Sumner, Bret D., "Directing Server Connection Based on Location Identifier", filed Aug. 15, 2013, U.S. Appl. No. 13/968,259.
Abou-El-Ella, Hassan, et al., "Segmented Customization Payload Delivery", filed Aug. 27, 2013, U.S. Appl. No. 14/010,518.
Sumner, Bret D., "Segmented Customization Package Within Distributed Server Architecture", filed Aug. 27, 2013, U.S. Appl. No. 14/010,522.
Masterson, Michelle E., et al., "Development and Testing of Payload Receipt by a Portable Electronic Device", filed Aug. 27, 2013, U.S. Appl. No. 14/010,523.
Masterson, Michelle E., et al., "System and Methods for Deferred and Remote Device Branding", filed Aug. 27, 2013, U.S. Appl. No. 14/010,524.
Masterson, Michelle E., et al., "System and Methods for Deferred and Remote Device Branding", filed Jul. 16 , 2014, International Serial No. PCT/US14/46773.
Callan, Jeffery S., et al., "Delivery of Oversized Branding Elements for Customization", filed Nov. 6, 2013, U.S. Appl. No. 14/073,321.
Indurkar, Dhananjay, "Background Delivery of Device Configuration and Branding", filed Jan. 16, 2014, U.S. Appl. No. 14/157,507.
Ahn, Chul Jin, et al., "Separation of Client Identification Composition from Customization Payload to Original Equipement Manufacturer Layer", filed Nov. 8, 2013, U.S. Appl. No. 14/075,687.
Ghoshal, Jagannath, et al., "Multiple Carrier Partition Dynamic Access on a Mobile Device", filed Jun. 5, 2014, U.S. Appl. No. 14/297,429.
Ahn, Chul Jin, et al., "Customization for Preloaded Applications", filed Mar. 31, 2014, U.S. Appl. No. 14/231,718.
First Action Interview Pre-Interview Communication dated Sep. 22, 2014, U.S. Appl. No. 13/468,028, filed May 9, 2013.
Foreign Communication from a Related Counterpart—International Search Report and Written Opinion, dated Jun. 3, 2014,PCT/US14/16650, filed on Feb. 16, 2014 [29701].
Urbanek, Robert E., "Delivery of Branding Content and Customizations to a Mobile Communication Device", filed , 201, International Serial No. PCT/US14/56778.
First Action Interview Office Action dated Mar. 16, 2015, U.S. Appl. No. 13/468,028, filed May 9, 2013.
Office Action dated Mar. 2, 2015, U.S. Appl. No. 13/622,234, filed Sep. 18, 2012.
FAIPP Pre-Interview Communication dated Mar. 26, 2015, U.S. Appl. No. 14/522,586, filed Oct. 24, 2014.
FAIPP Pre-Interview Communication dated Apr. 8, 2015, U.S. Appl. No. 13/844,104, filed Mar. 15, 2013.
Notice of Allowance dated Mar. 20, 2015, U.S. Appl. No. 13/763,428, filed Feb. 8, 2013.
Notice of Allowance dated Mar. 26, 2015, U.S. Appl. No. 13/763,434, filed Feb. 8, 2013.
Notice of Allowance dated Jan. 22, 2015, U.S. Appl. No. 13/899,566, filed May 21, 2013.
FAIPP Pre-Interview Communication dated Apr. 15, 2015, U.S. Appl. No. 14/060,712, filed Nov. 20, 2013.
FAIPP Pre-Interview Communication dated Mar. 4, 2015, U.S. Appl. No. 14/010,518, filed Aug. 27, 2013.
FAIPP Pre-Interview Communication dated Apr. 1, 2015, U.S. Appl. No. 14/010,522, filed Aug. 27, 2013.
FAIPP Pre-Interview Communication dated Apr. 3, 2015, U.S. Appl. No. 14/010,523, filed Aug. 27, 2013.
FAIPP Pre-Interview Communication dated Mar. 10, 2015, U.S. Appl. No. 14/010,524, filed Aug. 27, 2013.
FAIPP Pre-Interview Communication dated Apr. 8, 2015, U.S. Appl. No. 14/157,507, filed Jan. 16, 2014.
Foreign Communication from a Related Counterpart—International Preliminary Report on Patentability, dated Apr. 2, 2015, PCT/US13/55023, filed on Aug. 15, 2013 [16801].
Delker, Jason R., et al. "Subscriber Identity Module (SIM) Card Initiation of Custom Application Launcher Installation on a Mobile Communication Device," filed Mar. 4, 2015, U.S. Appl. No. 14/639,056.
Delker, Jason R., et al. "Network Access Tiered Based on Application Launcher Installation," filed Mar. 4, 2015, U.S. Appl. No. 14/639,060.
FAIPP Pre-Interview Communication dated Mar. 12, 2015, U.S. Appl. No. 13/972,827, filed Aug. 21, 2013.
Ghoshal, Jagannath, et al., "Multi-Step Mobile Device Initiation with Intermediate Partial Reset," filed Aug. 21, 2013, U.S. Appl. No. 13/972,827.
FAIPP Pre-Interview Communication dated Jun. 2, 2015, U.S. Appl. No. 14/152,627, filed Jan. 10, 2013.
Notice of Allowance dated Jul. 7, 2015, U.S. Appl. No. 14/522,586, filed Oct. 24, 2014.
FAIPP Pre-Interview Communication dated Apr. 23, 2014, U.S. Appl. No. 13/763,443, filed Feb. 8, 2013.
First Action Interview Office Action dated Jun. 16, 2014, U.S. Appl. No. 13/763,443, filed Feb. 8, 2013.
Office Action dated Jun. 16, 2015, U.S. Appl. No. 13/899,567, filed May 22, 2013.
Notice of Allowance dated May 7, 2015, U.S. Appl. No. 13/972,827, filed Aug. 21, 2013.
Notice of Allowance dated May 29, 2015, U.S. Appl. No. 14/085,474, filed Nov. 20, 2013.
Notice of Allowance dated May 8, 2015, U.S. Appl. No. 14/010,518, filed Aug. 27, 2013.

(56) References Cited

OTHER PUBLICATIONS

Notice of Allowance dated Jul. 8, 2015, U.S. Appl. No. 14/010,522, filed Aug. 27, 2013.
Notice of Allowance dated Jun. 26, 2015, U.S. Appl. No. 14/010,523, filed Aug. 27, 2013.
Notice of Allowance dated Apr. 28, 2015, U.S. Appl. No. 14/010,524, filed Aug. 27, 2013.
Restriction Requirement dated May 21, 2015, U.S. Appl. No. 14/073,321, filed Nov. 6, 2013.
FAIPP Pre-Interview Communication dated Jul. 8, 2015, U.S. Appl. No. 14/475,399, filed Sep. 2, 2014.
Amazon Kindle e-book reader, on public sale 2007, http://en.wikipedia.org/wiki/Amazon_Kindle. last accessed on Apr. 13, 2015.
Foreign Office Action dated Jul. 7, 2015, Japanese Application Serial No. 2013-543310, filed Jul. 7, 2015.
Notice of Allowance dated Aug. 6, 2015, U.S. Appl. No. 14/152,627, filed Jan. 10, 2013.
Notice of Allowance dated Jul. 15, 2015, U.S. Appl. No. 13/622,234, filed Sep. 18, 2012.
Notice of Allowance dated Jul. 16, 2015, U.S. Appl. No. 13/844,104, filed Mar. 15, 2013.
Final Office Action dated Aug. 10, 2015, U.S. Appl. No. 13/763,443, filed Feb. 8, 2013.
FAIPP Pre-Interview Communication dated Sep. 29, 2015, U.S. Appl. No. 14/163,035, filed Jan. 24, 2014.
FAIPP Pre-Interview Communication dated Aug. 20, 2015, U.S. Appl. No. 14/073,321, filed Nov. 6, 2013.
FAIPP Pre-Interview Communication dated Sep. 21, 2015, U.S. Appl. No. 14/231,718, filed Mar. 31, 2014.
Foreign Communication From a Related Counterpart Application, International Preliminary Report on Patentability dated Jul. 30, 2015, PCT/US13/68981, filed on Nov. 7, 2013 [22601].
Foreign Communication From a Related Counterpart Application, International Preliminary Report on Patentability dated Aug. 20, 2015, PCT/US14/13936, filed on Jan. 30, 2014 [28701].
Foreign Communication From a Related Counterpart Application, International Preliminary Report on Patentability dated Aug. 20, 2015, PCT/US14/13939, filed on Jan. 30, 2014 [28801].
Foreign Communication From a Related Counterpart Application, International Preliminary Report on Patentability dated Sep. 24, 2015, PCT/US14/16650, filed on Feb. 16, 2014 [29701].
Dummies, "Power Modes on Your Kindle Paperwhite", http://dummies.com/how-to/content/power-modes-on-your-kindle-paperwhite.html, last accessed on Jul. 31, 2015.
Cushings, "Buy Your Kindle at Waterstones? You're Now Locked Into One Sceensaver . . . The Waterstones Logo", https://www.techdirt.com/articles/20121206/16014421285/buy-your-kindle-waterstones-youre-now-locked-into-one-screensaver-waterstones-logo.shtml, last accessed Aug. 3, 2015.
Wikipedia, Extended Display Identification Data, https://en.wikipedia.org/wiki/Extended_Display_Identification_Data, last accessed Aug. 5, 2015.
Final Office Action dated Nov. 4, 2015, U.S. Appl. No. 13/468,028, filed May 9, 2012.
Advisory Action dated Nov. 3, 2015, U.S. Appl. No. 13/763,443, filed Feb. 8, 2013.
Notice of Allowance dated Oct. 26, 2015, U.S. Appl. No. 13/899,567, filed May 22, 2013.
FAIPP Pre-Interview Communication dated Oct. 16, 2015, U.S. Appl. No. 14/060,712, filed Oct. 23, 2013.
FAIPP Pre-Interview Communication dated Nov. 2, 2015, U.S. Appl. No. 14/060,719, filed Oct. 23, 2013.
First Action Interview Office Action dated Dec. 14, 2015, U.S. Appl. No. 14/060,719, filed Oct. 23, 2013.
Notice of Allowance dated Nov. 4, 2015, U.S. Appl. No. 14/073,321, filed Nov. 6, 2013.
First Action Interview Office Action dated Oct. 16, 2015, U.S. Appl. No. 14/157,507, filed Jan. 16, 2014.
FAIPP Pre-Interview Communication dated Oct. 7, 2015, U.S. Appl. No. 14/075,687, filed Nov. 8, 2013.
FAIPP Pre-Interview Communication dated Nov. 19, 2015, U.S. Appl. No. 14/297,429, filed Jun. 5, 2014.
Notice of Allowance dated Dec. 4, 2015, U.S. Appl. No. 14/475,399, filed Sep. 2, 2014.
Supplemental Notice of Allowability dated Dec. 14, 2015, U.S. Appl. No. 14/475,399, filed Sep. 2, 2014.
FAIPP Pre-Interview Communication dated Nov. 4, 2015, U.S. Appl. No. 14/619,677, filed Feb. 11, 2015.
Notice of Allowance dated Dec. 11, 2015, U.S. Appl. No. 14/619,677, filed Feb. 11, 2015.
Jrbanek, Robert E., "Generic Mobile Devices Customization Framework," filed Oct. 7, 2015, U.S. Appl. No. 14/877,215.
Ghoshal, Jagannath, et al., "Multi-Step Mobile Device Initiation with Intermediate Partial Reset," filed Aug. 6, 2015, U.S. Appl. No. 14/820,522.
Ghoshal, Jagannath, et al., "Dynamic Subscriber Identity Module," filed Feb. 11, 2015, U.S. Appl. No. 14/619,677.
Foreign Notice of Allowance dated Mar. 21, 2016, Japanese Application Serial No. 2013-543310, filed Jul. 7, 2015.
Advisory Action dated Jan. 29, 2016, U.S. Appl. No. 13/468,028, filed May 9, 2012.
Office Action dated Apr. 4, 2016, U.S. Appl. No. 13/468,028, filed May 9, 2012.
FAIPP Pre-Interview Communication dated Jan. 11, 2016, U.S. Appl. No. 14/877,215, filed Oct. 7, 2015.
FAIPP Pre-Interview Communication dated Feb. 25, 2016, U.S. Appl. No. 14/820,522, filed Aug. 6, 2015.
Final Office Action dated Mar. 9, 2016, U.S. Appl. No. 14/060,712, filed Oct. 23, 2013.
Final Office Action dated Feb. 24, 2016, U.S. Appl. No. 14/060,719, filed Oct. 23, 2013.
Final Office Action dated Feb. 16, 2016, U.S. Appl. No. 14/163,035, filed Jan. 24, 2014.
FAIPP Pre-Interview Communication dated Mar. 16, 2016, U.S. Appl. No. 13/968,259, filed Aug. 15, 2013.
Notice of Allowance dated Feb. 25, 2016, U.S. Appl. No. 14/157,507, filed Jan. 16, 2014.
Notice of Allowance dated Jan. 27, 2016, U.S. Appl. No. 14/075,687, filed Nov. 8, 2013.
First Action Interview Office Action dated Feb. 2, 2016, U.S. Appl. No. 14/297,429, filed Jun. 5, 2014.
First Action Interview Office Action dated Jan. 19, 2016, U.S. Appl. No. 14/231,718, filed Mar. 31, 2014.
Notice of Allowance dated Feb. 3, 2016, U.S. Appl. No. 14/639,056, filed Mar. 4, 2015.
Notice of Allowance dated Mar. 11, 2016, U.S. Appl. No. 14/639,060, filed Mar. 4, 2015.
Foreign Communication from a Related Counterpart—International Preliminary Report on Patentability, dated Mar. 10, 2016, PCT/US14/46773, filed on Jul. 16, 2014 [36501].
Foreign Communication from a Related Counterpart—International Search Report and Written Opinion, dated Apr. 4, 2016, PCT/US16/13272, filed on Jan. 13, 2016 [54001].
Ghoshal, Jagannath, et al., "Dynamic Subscriber Identity Module," filed Jan. 13, 2016, International Serial No. PCT/US16/13272.
Ghoshal, Jagannath, et al., "Dynamic Subscriber Identity Module," filed Mar. 7, 2016, U.S. Appl. No. 15/063,383.

* cited by examiner

ACTIVATION SEQUENCE USING PERMISSION BASED CONNECTION TO NETWORK

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Mobile communication devices may be purchased at service provider retail stores, electronics retail stores, and/or at general retail stores. A variety of activities may be performed to bring a new mobile communication into service. To use a mobile communication device on a cellular network, it may first be provisioned and/or activated. Provisioning a mobile communication device (e.g. a mobile phone) to operate on a wireless network involves defining and/or adjusting the mobile communication device's settings that are stored in the device and the settings stored on the network, so that the mobile communication device may properly access communication services and/or execute one or more desired applications, and the network may recognize the mobile communication device as authorized to receive service for those applications.

SUMMARY

In an embodiment, a mobile communication device is disclosed. The mobile device comprises a processor, a memory, an activation application stored in the memory. When executed by the processor, the activation application detects available connection options between the mobile communication device and a network and determines the quality of the available connection options. The activation application also makes a first attempt to complete the activation process over the best quality connection option. If the first attempt is unsuccessful, the activation application also makes a second attempt to complete the activation process over the next best quality connection option and completes the activation process on the mobile device over one or more of the connection options; wherein the mobile communication device communicates with a provisioning server via the connection to the network.

In an embodiment, a method for completing an activation process on a mobile device is disclosed. The method comprises detecting available connection options between the device and a network and determining the quality of the available connection options; ranking the available connection options according to quality. The method further comprises making a first attempt to complete the activation process over the first ranked connection option and, if the first attempt is unsuccessful, making a second attempt to complete the activation process over the second ranked connection option. The method further comprises completing the activation process over one or more of the connection options.

In an embodiment, a method for completing an activation process on a mobile device is disclosed. The method comprises detecting available connection options between the device at a network, determining the quality of the available connection options, and making a first attempt to complete the activation process over the best quality connection option. The method also comprises detecting a request for credentials from the connection, presenting an input screen to a user to input the credentials, and, if the credentials are correct, completing the activation process over the best quality connection option. If the first attempt is unsuccessful, the method comprises making a second attempt to complete the activation process over the next best quality connection option and completing the activation process over one or more of the connection options.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Embodiments of the disclosure are directed to methods and systems for completing an activation process on a mobile device. After a mobile device is purchased by a user, the activation process may be completed, where custom settings and information (or customization content) may be delivered to or accessed on the mobile device. Customization content may include graphics, images, audio files, splash screens, opening screens, backgrounds, and tones. Customization content may also include customer service numbers, links to messaging platforms, IP addresses and port numbers, client identification, and market catalogs. The customization content may be used to complete the activation process on the mobile device, where the customization content may be installed, downloaded, and/or otherwise accessed during the activation process. In some cases, the activation process may be completed by an application on the mobile device, such as an activation application. In some cases, the activation process may be initiated when an activation payload is delivered to the mobile device. The activation payload may comprise instructions for completing the activation process.

To download customization content and/or an activation payload to a mobile device, the mobile device may first establish a connection to a cellular network. An activation application of the mobile device (or another communication application) may be operable to detect available network connection options (or communication channels) between the mobile device and the network. The application may also determine the quality of each of the connection options and rank them based on quality. Quality may be defined based on signal strength, throughput rate, interference, and current traffic load for each of the connection options. For example, channel quality may be considered higher when the channel signal strength is higher, when the channel throughput rate is higher, when channel interference is lower, and current traffic load on the channel is lower.

In an embodiment, the quality of a plurality of alternative available channels may be quantified based on measured and/or indicated values of channel signal strength, channel throughput rate, channel interference, and/or current traffic load on the channel. The quantification may be determined as a linear combination of the several separate metric values or by some other logical operation. In an embodiment, the ranking of quality may be based on such a linear combination of the several separate metric values. In an embodiment, the ranking of quality may be determined based on one or two of the metrics, and if a tie exists, the remaining metrics may be taken into consideration to break the tie.

The application may then attempt to establish a connection to the network using the best connection option, wherein if the attempt is unsuccessful, the next best option may be attempted. Additionally, if a connection option entails the input of credentials, such as a security code, an authorization code, a password, a pin, or a key, to establish the connection, the application may provide an input screen to the user without navigating away from or interrupting the activation process. In some cases, if a first connection to the network is lost for some reason, the application may continue to detect available connection options and attempt to reestablish connection with the network over a different connection. In some cases, the activation process may be completed over multiple connections, or over multiple connection sessions, to the network, and may be paused and reinitiated as desired.

In an embodiment, the application may attempt to complete the activation process or a portion of the activation process over a channel for a predefined period of time. When the predefined period of time expires, the application may attempt to complete the activation process or portion of the activation process over the next best channel, again for a predetermined period of time. The application may ultimately time out on the lowest ranked channel and may then retry the highest ranked channel. In this way the application keeps trying to complete activation or the next portion of activation without blocking indefinitely based on the failure or unavailability of one channel while another alternative channel may in fact be available for continuing the activation or portion of the activation process.

Current systems may typically download the activation payload during the initial startup of the mobile device in one attempt through a single communication channel (or connection option), with no capability for pausing and restarting the download (i.e. using a multi-stage download) or using multiple communication channels to complete the download. This may create irritating delays and problems if the channel is blocked or slow. Additionally, current systems may not have the option to provide credentials for a communication channel within the initial startup process. For example, systems may not provide the option for the user to input a security code or authorization code to access the activation payload or a portion of the activation payload through an access point, for example through a WiFi access point. Enabling a device to work with a partial download while also creating a multiple channel, and in some cases a multiple staged, download may improve timing and efficiency during the initial startup of the mobile device. Because these capabilities may result in some use of a partially activated device, data from the activation payload may be preserved once the activation process is completed. To accomplish this, multiple memory partitions on the mobile device may be used to preserve data and/or restrict access to data.

The mobile communication device may have memory established as a system memory partition and a user memory partition. An operating system of the mobile communication device may restrict write access to the system memory partition and may prevent the contents of the system memory partition being erased during reset operations, for example resetting to factory defaults. For example, a user may be prevented from writing to the system memory partition and/or from causing writing to the system memory partition. By contrast, the operating system of the mobile communication device may allow unrestricted write access to the user memory partition. For example, a user of the mobile communication device may be permitted by the operating system to write information into the user memory partition, at least indirectly by exercising user interface control selections, for example entering personal contacts, installing third party applications, downloading ring tones, and the like. During a reset, for example during a reset to factory defaults, the information in the user memory partition may be deleted by the operating system. The ANDROID operating system used by some mobile communication devices may establish a system memory partition and a user memory partition.

The operating system may further provide write access to a carrier memory partition to privileged users or automated processes. For example, an individual providing a carrier memory partition key or password, for example an employee or contractor associated with a wireless communication service provider, may be allowed by the operating system to write to the carrier memory partition. Alternatively, instructions that execute on the mobile communication device may be granted the privilege to write to the carrier memory partition by the operating system based on the instructions providing the key or password. In an embodiment, the key or password is unavailable and unknown to a user of the mobile communication device, for example the key or password may only be known to the wireless service provider and/or carrier. In some cases, this may be used when the activation payload and/or customization content is delivered to the device to prevent unwanted access to the secure information. For example, if the mobile device is reset for any reason, the activation payload may be retained in the carrier partition.

In an embodiment, the instructions may invoke an application programming interface (API) provided by the operating system to write to the carrier memory partition, and the API call may entail providing the key or password associated with the carrier memory partition. In some contexts, this may be referred to as a carrier memory partition key or a carrier memory partition password. An automated procedure or function executed on the mobile communication device that presents a carrier memory partition key or password, for example a script wirelessly transmitted to the mobile communication device, may be permitted to write to the carrier memory partition. The carrier memory partition may be used to store branding information. The carrier memory partition further may be used to store other information unrelated to branding and/or customization content. For further details about carrier memory partitions, see U.S. patent application Ser. No. 13/763,428, filed Feb. 8, 2013, entitled "System and Method of Storing Service Brand Packages On a Mobile Device," by Brandon C. Annan, et al., which is hereby incorporated by reference in its entirety.

Figure 1:
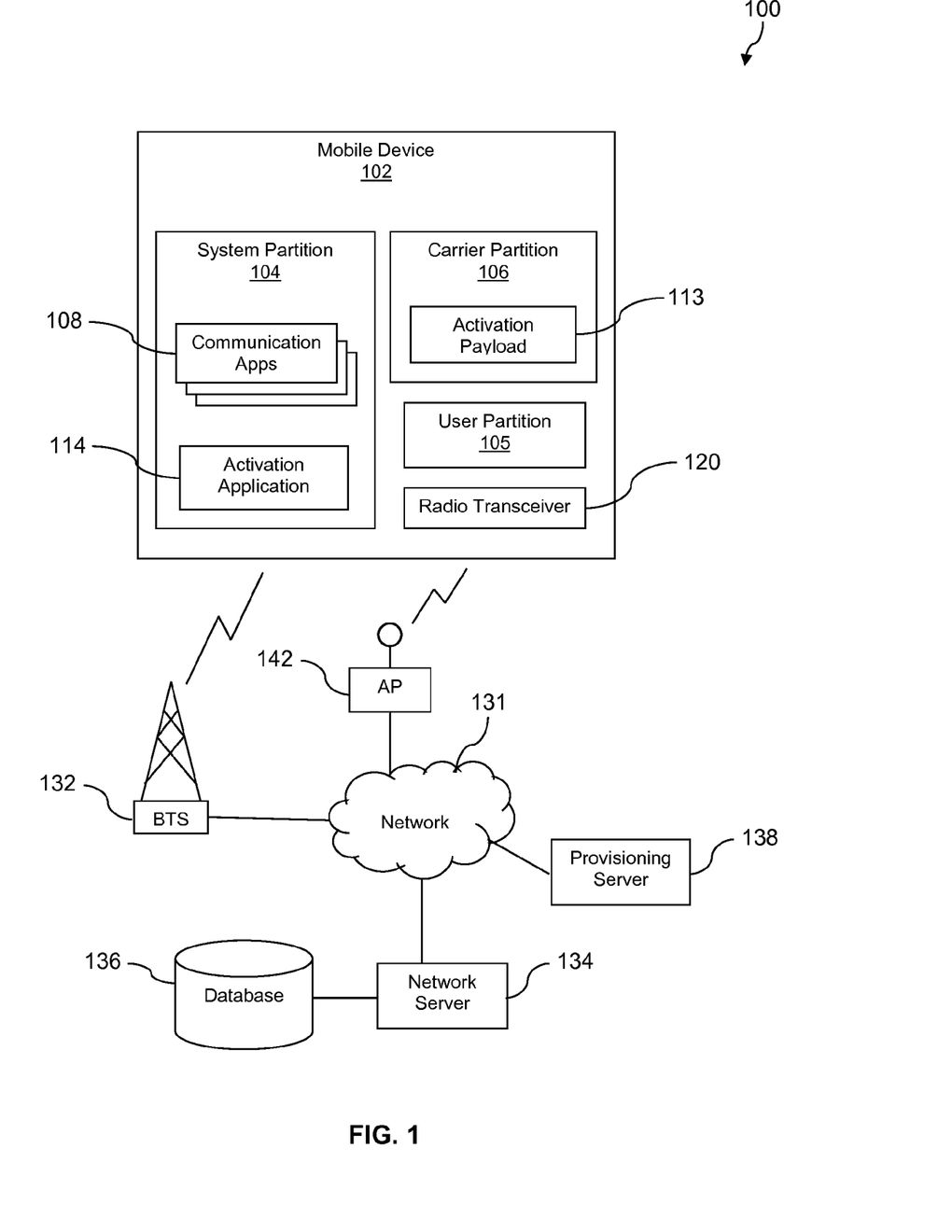
FIG. 1 is an illustration of a communication system according to an embodiment of the disclosure.

Turning now to FIG. 1, a communication system 100 is described. In an embodiment, the communication system 100 comprises a mobile communication device 102 comprising a cellular radio transceiver 120, and a plurality of communication applications 108. The mobile communication device 102 may engage in a variety of communication exchanges. The mobile communication device 102 may be a mobile phone, a personal digital assistant (PDA), a media player, a laptop computer, a tablet computer, or another electronic device having a macro cellular radio transceiver.

In an embodiment, the system 100 comprises a network 131. The network 131 may be a private network, a public network, or a combination thereof. The network 131 may promote voice communications and data communications. Portions of the network 131 may provide an IP Multimedia Subsystem (IMS) network. The mobile communication device 102 may couple to the network 131 by a variety of communication paths. The mobile communication device 102 may communicate with a base transceiver station (BTS) 132 via a wireless link according to any of a variety of wireless communications protocols, including but not limited to code division multiple access (CDMA), long-term evolution (LTE), worldwide interoperability for microwave access (WiMAX), global system for mobile communications (GSM), or other wireless communication protocol. In some embodiments, the mobile communication device 102 may communicate with the base transceiver station (BTS) 132 via the cellular radio transceiver 120 of the mobile communication device 102. The wireless link between the mobile communication device 102 and the base transceiver station 132 may couple the mobile communication device 102 to the network 131. Additionally, the base transceiver station 132 may also be known as a cell tower.

It is understood that the system 100 may comprise any number of mobile communication devices 102 and any number of base transceiver stations 132. The collectivity of base transceiver stations 132 may be said to comprise a radio access network, in that these base transceiver stations 132 may provide radio communication links to the mobile communication devices 102 to provide access to the network 131. The radio access network may be abstracted in different ways and may comprise, in addition to the base transceiver stations 132, servers and data stores such as home location registers (HLRs) or servers that implement the functionality of home location registers, visitor location registers (VLRs) or servers that implement the functionality of visitor location registers, base station controllers (BSCs), mobile switching centers (MSCs), and other network nodes that are specifically associated with providing wireless access and connectivity to the mobile communication devices 102.

In some embodiments, the mobile communication device 102 may be operable to communicate with the network 131 via a wireless access point (AP) 142. In some embodiments, the mobile communication device 102 may use a connection via the wireless access point 142 to receive an activation payload and/or complete an activation process on the mobile communication device 102. For example, the wireless access point 142 may be at a retail store where the mobile communication device 102 is purchased, at the residence or workplace of the user of the mobile communication device 102, and/or a corporate office where the mobile communication device 102 may be configured by a company before being used by an employee of the company. The wireless access point 142 may provide a wireless communication link to the mobile communication device 102 using a WiFi communication protocol or another short-range radio communication protocol (such as near-field communication and/or Bluetooth®). The wireless access point 142 may be communicatively coupled to the network 131 and may communicatively couple the mobile communication device 102 to the network 131.

The communication applications 108 may comprise a voice communication application, a data communication application, a web browser application, an email application, a short message system (SMS) or texting application, a multimedia message system (MMS) application, and other communication applications. The communication applications 108 may be standard communication applications that are delivered by an original equipment manufacturer (OEM) who assembles the mobile communication device 102. The communication applications 108 may be stored as firmware or software in a memory of the mobile communication device 102. The communication applications 108 may expose application programming interfaces (APIs) accessible to other applications to provide wireless communication functionality to the other applications.

The communication applications 108 may be any of a variety of applications. One of the communication applications 108 may be a telephone application that receives dialed digits and attempts to originate a voice call—for example a voice over IP (VoIP) call—to a called telephone. The telephone application may also promote receiving voice calls originated by another communication device. One of the communication applications 108 may be a web browser application that requests content from the network 131, for example by sending out a hypertext transport protocol (HTTP) message embedding a universal reference locator (URL). One of the communication applications 108 may be a media player that requests streaming or downloading media from the network 131. Many of the communication applications 108 may depend upon communication service provided by an IMS network to deliver their functionality to an end user of the mobile communication device 102. One of the communication applications 108 may comprise a mobile transaction interface, where a user may complete a purchase using the application, and secure information, such as credit card information, may be communicated through the application. In some embodiments, the communication applications 108 may be stored in a system memory partition 104 of the memory of the mobile communication device 102.

In some embodiments, the mobile communication device 102 may comprise a memory system divided into one or more partitions. The partitions may include a system memory partition 104, a carrier memory partition 106, and a user memory partition 105. In some embodiments, content may be stored and/or executed in one or more of the memory partitions. In some embodiments, the content stored in the memory of the mobile communication device 102 may be associated with the manufacturer of the device, or may be content that is pre-loaded onto the device. In some embodiments, the communication applications 108 may be stored in the system memory partition 104.

Additionally, an activation application 114 may be stored and/or executed in the system memory partition 104, wherein the activation application 114 may be operable to complete customization or activation processes for the mobile communication device 102. In some embodiments, one or more of the memory locations may comprise non-volatile or persistent memory. In some embodiments, the activation process may comprise provisioning the mobile communication device 102, wherein provisioning may comprise setting up the mobile communication device 102 for communication and/or service with the network 131. In other words, provisioning may enable the mobile communication device 102 to connect to the network 131 to allow communication to and from the mobile communication device 102.

In some embodiments, an activation payload 113 may be delivered to the mobile communication device 102 during the initial activation of the device 102, or during a subsequent activation process, such as if the mobile communication device 102 is reset or returned to factory settings. The activation payload 113 may contain information and/or instructions for completing the activation process. In some embodiments, the activation payload 113 may be delivered in accordance with OMA DM (open mobile alliance device management) protocol or framework. In other words, the activation payload 113 may be delivered as an OMA DM payload. In some embodiments, the activation payload 113 may be delivered to the mobile communication device 102 from a provisioning server 138 in communication with the mobile communication device 102 via the network 131.

In some embodiments, the activation payload 113 may be stored in the carrier memory partition 106 of the mobile communication device 102. In some embodiments, at least a portion of the activation payload may be stored in a SIM (subscriber identity module) card or a SD (secure digital) card on the mobile communication device 102, wherein the SIM card or SD card may provide removable memory on the mobile communication device 102. The activation payload 113 may communicate with the activation application 114, wherein the activation application 114 may use the data of the activation payload 113 to complete the activation process.

In some embodiments, during the initial, out-of-the-box, operation of the mobile communication device 102, the mobile communication device 102 may attempt to establish a connection with the network 131 to begin the activation process. For example, the activation application 114 may search for a connection to the network 131 in order to request the activation payload 113. There may be various connection options available to the mobile communication device 102, such as cellular, WiFi, Bluetooth, near-field communication, and other wireless connections. Additionally, the mobile device 102 may optionally be connected to the network 131 via a wired connection. In some embodiments, the activation application 114, or another communication application 108 on the mobile communication device 102, may be operable to detect available connection options between the mobile communication device 102 and the network 131. Additionally, the activation application 114 may be operable to determine the quality of each of the connection options based on strength, speed, interference, and traffic, for example. The activation application 114 may also rank the available connection options based on the determined quality, wherein the rank may be used when attempting connections. The activation application 114 may then attempt to complete the activation process using the available connection options, wherein the best available connection may be attempted first.

In some embodiments, a connection option may entail the input of credentials, such as a password, pin, key, or other identifying information, to use the connection. In this case, the activation application 114 may present the user with a screen or other interface in which to input the credentials. Instead of redirecting the user out of the activation process to input the credentials, the activation application 114 may integrate the presentation of the input screen into the process, such that the activation process is not interrupted. In some embodiments, the user may not have access to the required credentials, such as a password for a WIFI hot spot, and may be given the option to skip that particular connection option and move on to the next best option to attempt to complete the activation process. Additionally, if a connection to the network 131 is lost for any reason, the activation application 114 may continue to detect and attempt connection over multiple options during the activation process, for example over a different communication channel and/or using a different communication protocol, wherein the process may be paused and reinitiated at any time.

In an examplary embodiment, a user may be at their home when they initiate the activation of the mobile communication device 102. The connection options available may comprise the user's home WIFI network, a cellular radio connection, and possibly a neighbor's WIFI network. The mobile communication device 102 may attempt to establish a connection with the home WIFI network, wherein a screen may be presented to the user to input the password for the WIFI. At some point during the activation process, the user's home WIFI network may be compromised for some reason. The device may then attempt to make a connection via the neighbor's WIFI network and present the user with a screen to input the password. However, the user may not have the password, and may therefore choose to skip or reject the connection via the neighbor's WIFI network. Instead of getting stuck trying to connect to the neighbor's WIFI network, the application may then move on and attempt other available connection options, such as the cellular connection and/or the user's home WIFI network (if it is reestablished).

Figure 2:
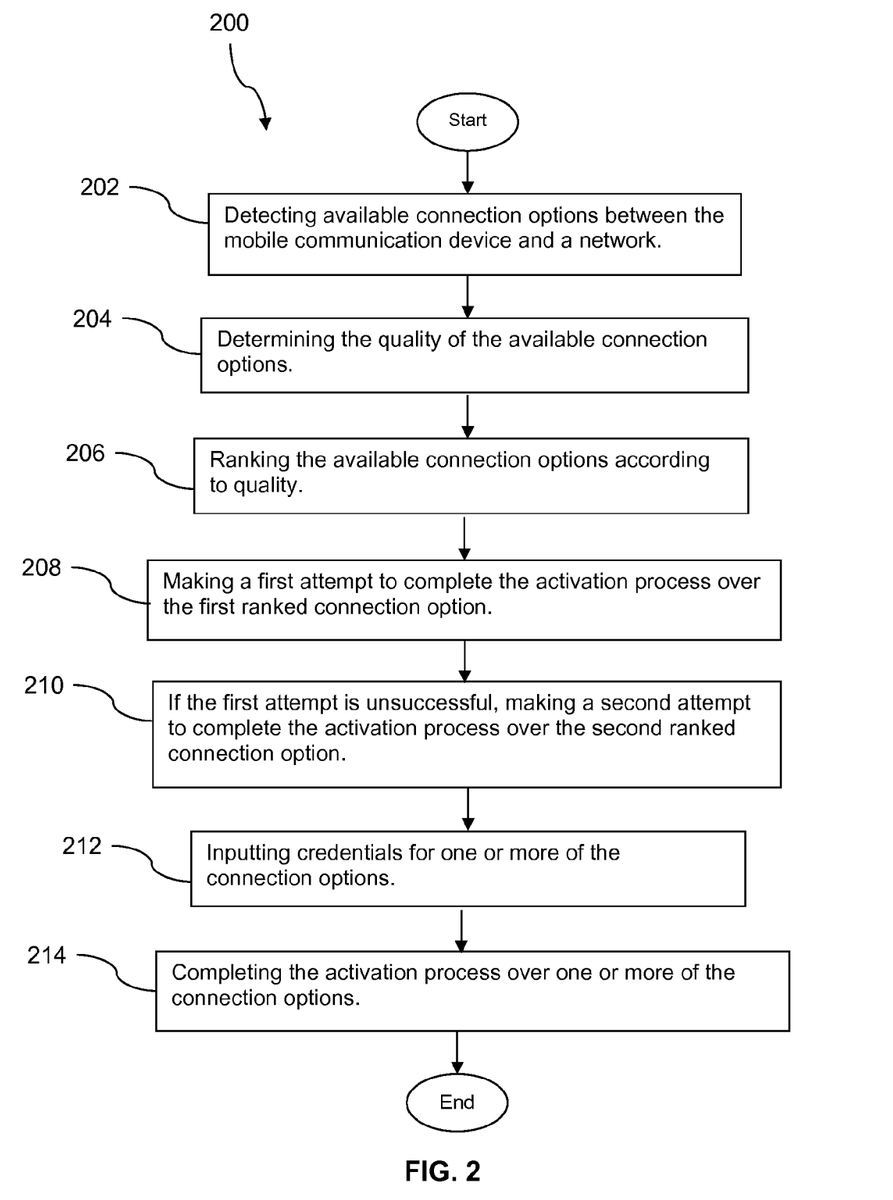
FIG. 2 is a flow chart illustrating a method according to an embodiment of the disclosure.

Turning now to FIG. 2, a method 200 for activation of a mobile communication device is described. At block 202, available connection options may be detected between the mobile communication device and a network. At block 204, the quality of the available connection options may be determined. In some embodiments, available connection options may comprise a cellular connection, a WIFI connection, a Bluetooth connection, and a near-field communication connection. At block 206, the available connection options may be ranked according to quality. At block 208, a first attempt may be made to complete the activation process over the first ranked connection option.

In some embodiments, if the first attempt is unsuccessful, at block 210, a second attempt may be made to complete the activation process over the second ranked connection option. In some embodiments, the method 200 may optionally comprise, at block 212, inputting credentials for one or more of the connection options. At block 214, the activation process may be completed over one or more of the connection options. In some embodiments, the quality of the available connection options may be determined based on signal strength, throughput rate, interference, and current traffic load. In some embodiments, the first attempt may be unsuccessful because the connection entails the input of credentials that the user does not have or know. In some embodiments, the method may be completed by an activation application on the mobile device. In some embodiments, the activation application may detect the request for credentials for a particular connection and may provide an input screen to the user to input the credentials. In some embodiments, successive attempts to connect to the network may be made until the activation process is completed. In some embodiments, the activation process may be paused if the connection to the network is lost, and the process may continue if the connection to the network is reestablished.

Figure 3:
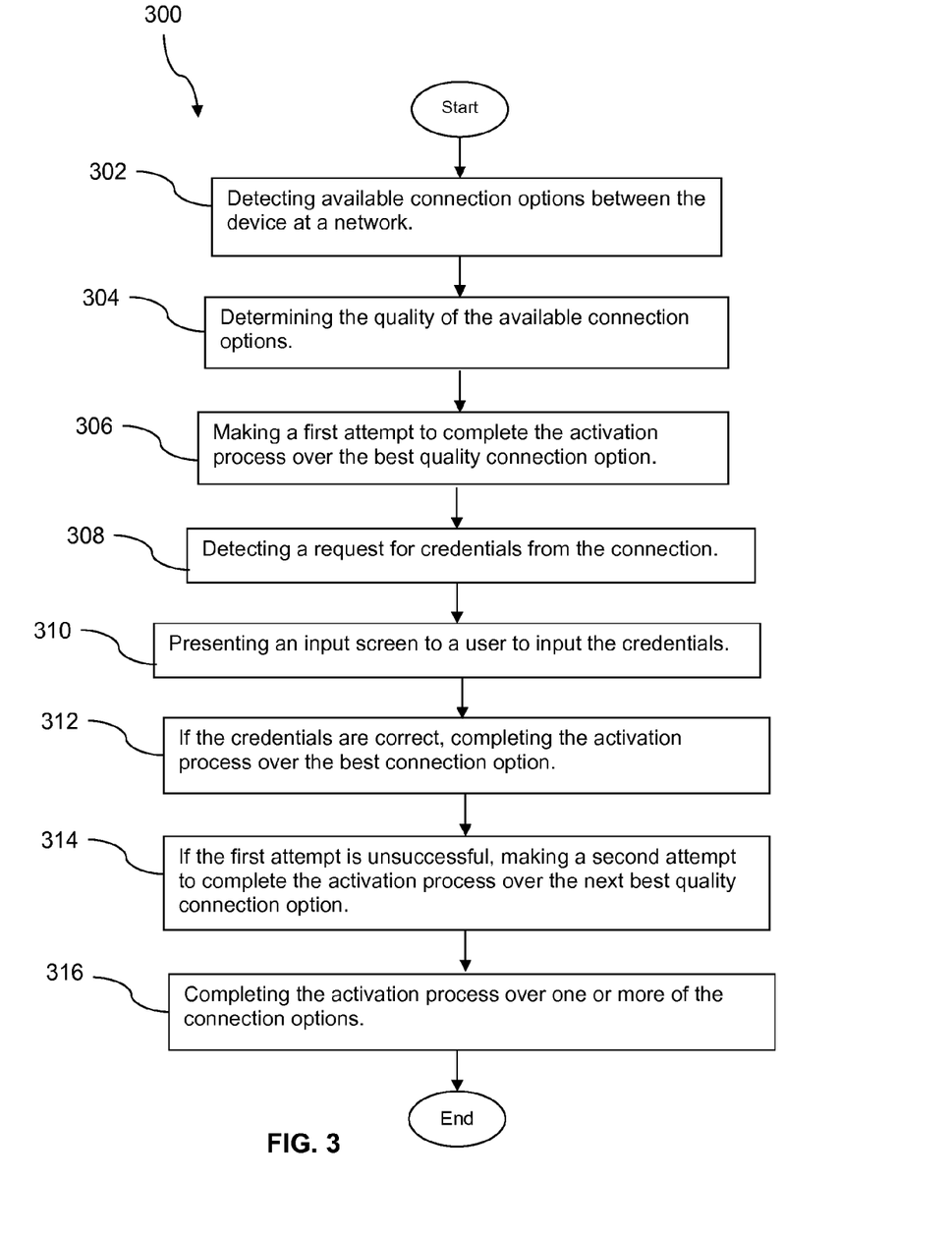
FIG. 3 is a flow chart illustrating another method according to an embodiment of the disclosure.

Turning now to FIG. 3, a method 300 for activation of a mobile device is described. At block 302, available connection options may be detected between the mobile communication device and a network. At block 304, the quality of the available connection options may be determined. At block 306, a first attempt may be made to complete the activation process over the best quality connection option. At block 308, a request for credentials may be detected from the connection. At block 310, an input screen may be presented to a user to input the credentials. At block 312, if the credentials are correct, the activation process may be completed over the best quality connection option.

At block 314, if the first attempt is unsuccessful, a second attempt may be made to complete the activation process over the next best quality connection option. At block 316, the activation process may be completed over one or more of the connection options. In some embodiments, the method 300 may further comprise, if the second attempt is unsuccessful, successive attempts to connect to the network are made until the activation process in completed. In some embodiments, the method 300 may further comprise receiving an activation payload to the device via the connection with the network, wherein the activation process is at least partially completed using the activation payload. In some embodiments, the method may be completed by an activation application on the mobile communication device. In some embodiments, the activation process may be partially completed over each of a plurality of different connection options. In some embodiments, the activation process may be paused if the connection to the network is lost, and the process may continue if the connection to the network is reestablished.

Figure 4:
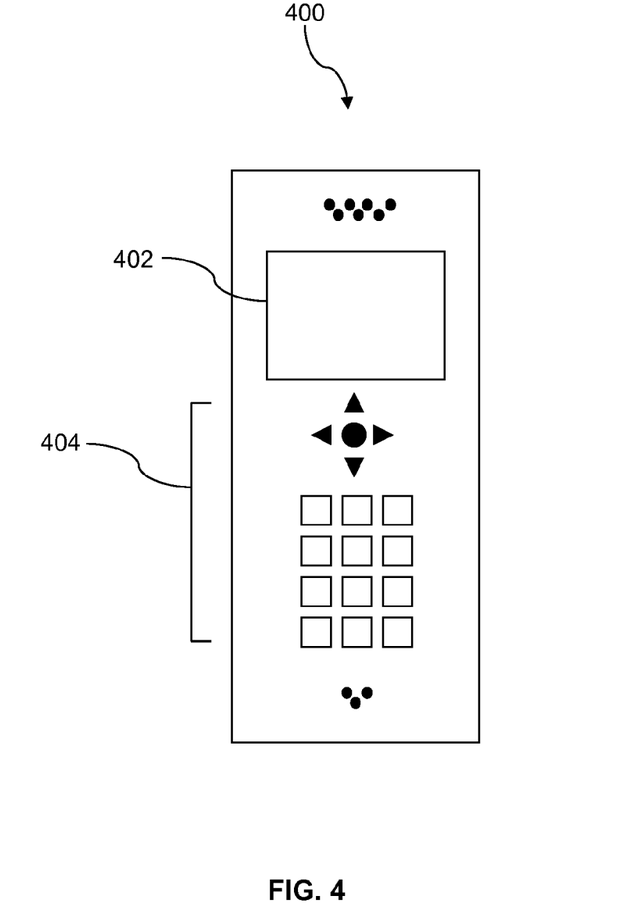
FIG. 4 is an illustration of a mobile communication device according to an embodiment of the disclosure.

FIG. 4 depicts the mobile device 400, which is operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 5:
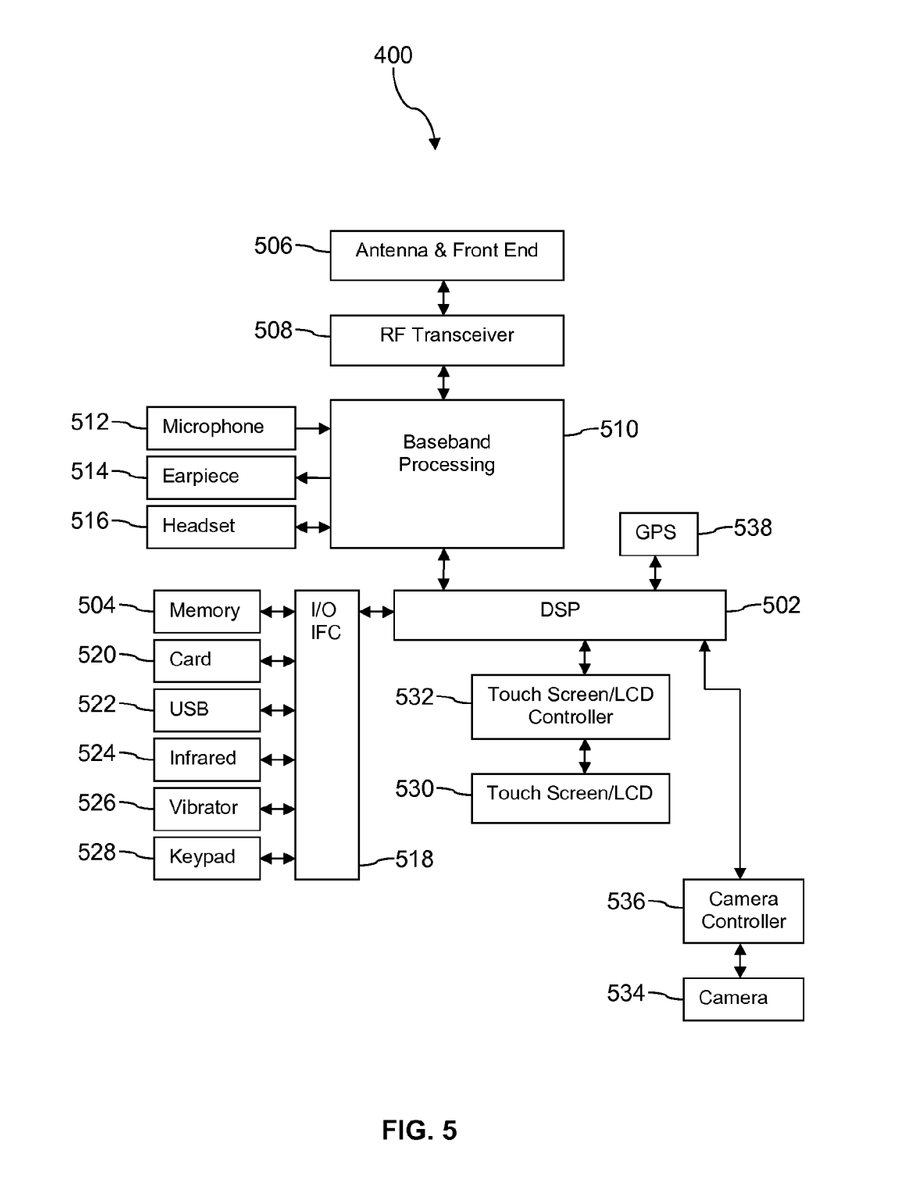
FIG. 5 is a block diagram of a mobile communication device according to an embodiment of the disclosure.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 6A:
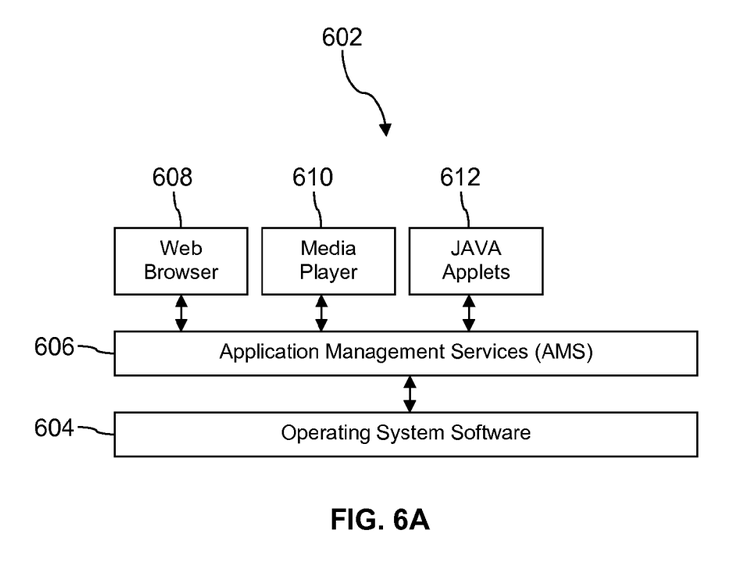
FIG. 6A is a block diagram of a software architecture of a mobile communication device according to an embodiment of the disclosure.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 6B:
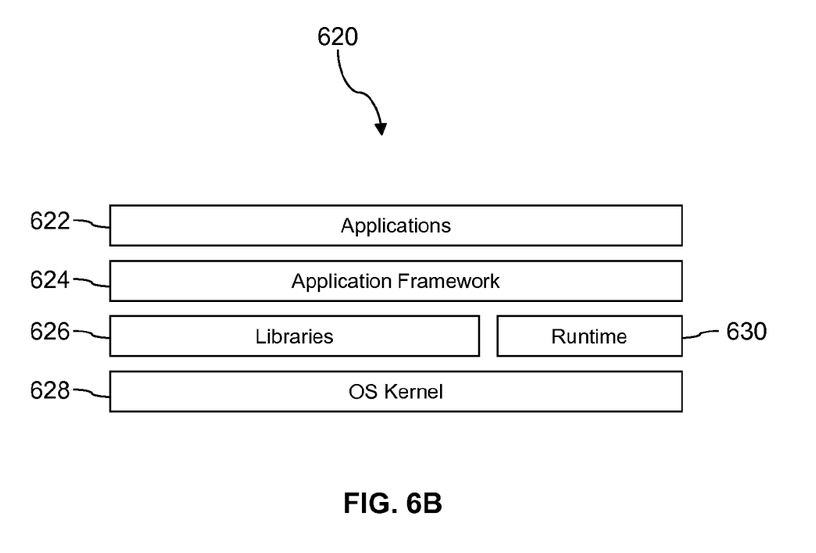
FIG. 6B is a block diagram of another software architecture of a mobile communication device according to an embodiment of the disclosure.

FIG. 6B illustrates an alternative software environment 620 that may be implemented by the DSP 502. The DSP 502 executes operating system software 628 (for example an operating system kernel) and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
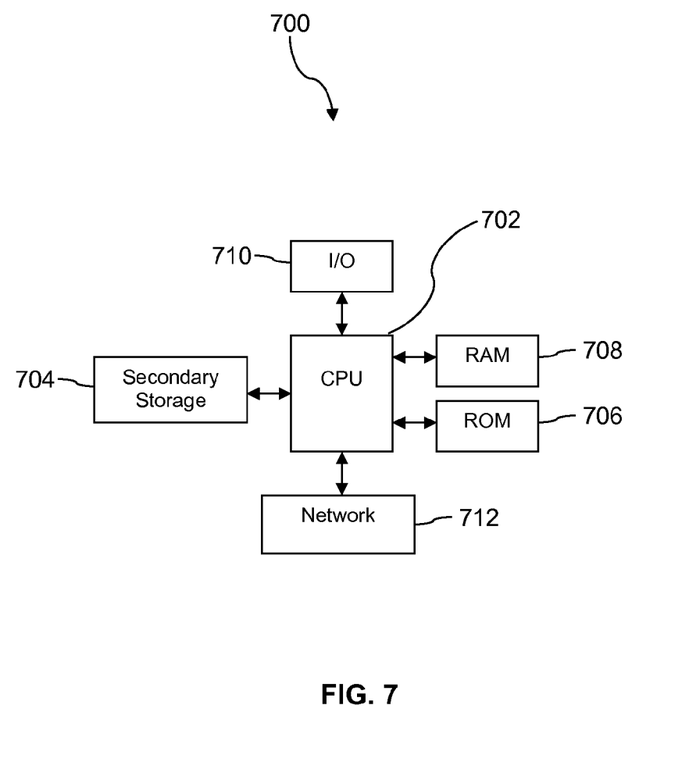
FIG. 7 illustrates an exemplary computer system suitable for implementing the several embodiments of the disclosure.

FIG. 7 illustrates a computer system 700 suitable for implementing one or more embodiments disclosed herein. The computer system 700 includes a processor 702 (which may be referred to as a central processor unit or CPU) that is in communication with memory devices including secondary storage 704, read only memory (ROM) 706, random access memory (RAM) 708, input/output (I/O) devices 710, and network connectivity devices 712. The processor 702 may be implemented as one or more CPU chips.

It is understood that by programming and/or loading executable instructions onto the computer system 700, at least one of the CPU 702, the RAM 708, and the ROM 706 are changed, transforming the computer system 700 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 704 is typically comprised of one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution. The ROM 706 is used to store instructions and perhaps data which are read during program execution. ROM 706 is a non-volatile memory device which typically has a small memory capacity relative to the larger memory capacity of secondary storage 704. The RAM 708 is used to store volatile data and perhaps to store instructions. Access to both ROM 706 and RAM 708 is typically faster than to secondary storage 704. The secondary storage 704, the RAM 708, and/or the ROM 706 may be referred to in some contexts as computer readable storage media and/or non-transitory computer readable media.

I/O devices 710 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 712 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 712 may enable the processor 702 to communicate with the Internet or one or more intranets. With such a network connection, it is contemplated that the processor 702 might receive information from the network, or might output information to the network in the course of performing the above-described method steps. Such information, which is often represented as a sequence of instructions to be executed using processor 702, may be received from and outputted to the network, for example, in the form of a computer data signal embodied in a carrier wave.

Such information, which may include data or instructions to be executed using processor 702 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 702 executes instructions, codes, computer programs, scripts which it accesses from hard disk, floppy disk, optical disk (these various disk based systems may all be considered secondary storage 704), ROM 706, RAM 708, or the network connectivity devices 712. While only one processor 702 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 704, for example, hard drives, floppy disks, optical disks, and/or other device, the ROM 706, and/or the RAM 708 may be referred to in some contexts as non-transitory instructions and/or non-transitory information.

In an embodiment, the computer system 700 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 700 to provide the functionality of a number of servers that is not directly bound to the number of computers in the computer system 700. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 700, at least portions of the contents of the computer program product to the secondary storage 704, to the ROM 706, to the RAM 708, and/or to other non-volatile memory and volatile memory of the computer system 700. The processor 702 may process the executable instructions and/or data structures in part by directly accessing the computer program product, for example by reading from a CD-ROM disk inserted into a disk drive peripheral of the computer system 700. Alternatively, the processor 702 may process the executable instructions and/or data structures by remotely accessing the computer program product, for example by downloading the executable instructions and/or data structures from a remote server through the network connectivity devices 712. The computer program product may comprise instructions that promote the loading and/or copying of data, data structures, files, and/or executable instructions to the secondary storage 704, to the ROM 706, to the RAM 708, and/or to other non-volatile memory and volatile memory of the computer system 700.

In some contexts, the secondary storage 704, the ROM 706, and the RAM 708 may be referred to as a non-transitory computer readable medium or a computer readable storage media. A dynamic RAM embodiment of the RAM 708, likewise, may be referred to as a non-transitory computer readable medium in that while the dynamic RAM receives electrical power and is operated in accordance with its design, for example during a period of time during which the computer system 700 is turned on and operational, the dynamic RAM stores information that is written to it. Similarly, the processor 702 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A mobile communication device comprising:
a processor;
a non-transitory memory;
an activation application stored in the non-transitory memory that when executed by the processor, configures the processor to:
  prior to making a first attempt to complete an activation process to initially activate the mobile communication device, detect available connection options between the mobile communication device and a network;
  determine the quality of each of the detected available connection options;
  in response to determining the quality of each of the available connection options, make the first attempt to complete the activation process over the best quality connection option among the detected available connection options;
  in response to the first attempt being unsuccessful, make a second attempt to complete the activation process over the next best quality connection option among the detected available connection options;
  receive an activation payload from a provisioning server via at least one connection to the network over at least one of the detected available connection options to the network; and
  using the activation payload, complete the activation process on the mobile device via the at least one connection to the network over at least one of the detected available connection options to the network.

2. The device of claim 1, wherein the non-transitory memory of the mobile communication device comprises a system partition, a carrier partition, and a user partition.

3. The device of claim 1, wherein the available connection options comprise a cellular connection, a WIFI connection, a Bluetooth connection, and a near-field communication connection.

4. The device of claim 1, wherein successive attempts to connect to the network are made until the activation process is completed, and wherein the activation process is paused if the at least one connection to the network is lost, and the process continues if the at least one connection to the network is reestablished.

5. A method for completing an activation process on a mobile communication device comprising:
   prior to making a first attempt to complete an activation process to initially activate a mobile communication device, detecting, by an activation application stored in a non-transitory memory of the mobile communication device and executable by a processor of the mobile communication device, available connection options between the mobile communication device and a network;
   determining, by the activation application, the quality of each of the detected available connection options;
   ranking, by the activation application, the detected available connection options according to quality;
   in response to determining the quality and the ranking of each of the detected available connection options, making, by the activation application, the first attempt to complete the activation process over the first ranked connection option among the detected available connection options;
   in response to the first attempt being unsuccessful, making, by the activation application, a second attempt to complete the activation process over the second ranked connection option among the detected available connection options;
   receiving, by the activation application, an activation payload via at least one connection to the network over at least one of the detected available connection options to the network; and
   using the activation payload, completing, by the activation application, the activation process via the at least one connection to the network over at least one of the detected available connection options.

6. The method of claim 5, wherein available connection options comprise a cellular connection, a WIFI connection, a Bluetooth connection, and a near-field communication connection.

7. The method of claim 5, wherein the quality of the available connection options is determined based on signal strength, throughput rate, interference, and current traffic load.

8. The method of claim 5, wherein the first attempt is unsuccessful because the at least one connection requires the input of credentials that a user of the mobile communication device does not have or know.

9. The method of claim 5, further comprising inputting credentials for one or more of the detected available connection options.

10. The method of claim 9, wherein the activation application detects the request for credentials for a particular connection and provides an input screen to the user to input the credentials.

11. The method of claim 5, wherein successive attempts to connect to the network are made until the activation process is completed.

12. The method of claim 11, wherein the activation process is paused if the at least one connection to the network is lost, and the process continues if the at least one connection to the network is reestablished.

13. A method for completing an activation process on a mobile communication device comprising:
   prior to making a first attempt to complete an activation process to initially activate a mobile communication device, detecting, by an activation application stored in a non-transitory memory of the mobile communication device and executable by a processor of the mobile communication device, available connection options between the mobile communication device at a network;
   determining, by the activation application, the quality of each of the detected available connection options;
   in response to determining the quality of each of the detected available connection options, making, by the activation application, the first attempt to complete the activation process over the best quality connection option among the detected available connection options;
   detecting, by the activation application, a request for credentials from a connection corresponding to the best quality connection option;
   presenting an input screen to a user to input the credentials;
   in response to the credentials being correct, at least partially completing, by the activation application, the activation process over the best quality connection option among the detected available connection options;
   in response to the first attempt being unsuccessful, making, by the activation application, a second attempt to complete the activation process over the next best quality connection option among the detected available connection options;
   receiving, by the activation application, an activation payload via at least one connection with the network over at least one of the detected available connection options; and
   completing, by the activation application, the activation process via the at least one connection to the network over at least one of the detected available connection options, wherein the activation process is at least partially completed using the activation payload.

14. The method of claim 13, further comprising, if the second attempt is unsuccessful, making successive attempts to connect to the network until the activation process in completed.

15. The method of claim 13, wherein the activation process is partially completed over each of a plurality of different connection options.

16. The method of claim 15, wherein the activation process is paused if the at least one connection to the network is lost, and the process continues if the at least one connection to the network is reestablished.

* * * * *